(12) United States Patent
Nakai et al.

(10) Patent No.: US 6,170,016 B1
(45) Date of Patent: Jan. 2, 2001

(54) SYSTEM FOR SELECTIVELY REQUESTING DATA FROM A SERVER BASED ON PRIOR ACCEPTED REQUESTS, TRANSMISSION RATE, AND TRANSMISSION CAPACITY

(75) Inventors: Shinji Nakai, Yokohama; Izuru Narita, Yamato; Hidefumi Suzuki, Kawasaki; Takayuki Tanaka, Yokohama, all of (JP)

(73) Assignee: International Business Machines Corp., Armonk, NY (US)

( * ) Notice: Under 35 U.S.C. 154(b), the term of this patent shall be extended for 0 days.

(21) Appl. No.: 09/207,816

(22) Filed: Dec. 9, 1998

(30) Foreign Application Priority Data

Dec. 26, 1997 (JP) .................................................... 9-359076

(51) Int. Cl.$^7$ .................................................... G06F 15/16
(52) U.S. Cl. ............................ 709/232; 709/233; 709/237
(58) Field of Search ................................... 709/235, 224, 709/232, 233, 237; 370/232, 423; 714/1

(56) References Cited

U.S. PATENT DOCUMENTS

| 4,677,616 | * | 6/1987 | Franklin | 370/423 |
| 5,197,127 | * | 3/1993 | Waclawsky et al. | 709/224 |
| 5,434,860 | * | 7/1995 | Riddle | 370/232 |
| 5,446,874 | * | 8/1995 | Waclawsky et al. | 714/1 |
| 5,864,678 | * | 1/1999 | Riddle | 709/235 |

FOREIGN PATENT DOCUMENTS 185633    7/1997   (JP) .

* cited by examiner

*Primary Examiner*—Le Hien Luu
(74) *Attorney, Agent, or Firm*—A. Bruce Clay; Myers, Bigel, Sibley & Sajovec

(57) ABSTRACT

A content collection part compares the transmission rate (TD) inputted from a transmission rate monitoring part with a threshold value (C–α) in response to a start operation by a user. When a condition TD<(C–α) is satisfied, the content collection part starts an automatic content collection part to perform a background process to collect URL contents which were set up beforehand from a Web server. When the user designates URL contents, the content collection part controls the automatic content collection part to terminate the background process and enters a foreground process to collect the designated URL contents.

24 Claims, 9 Drawing Sheets (A Case where α = 0 is Shown)

(A Case where α = 0 is Shown)

SYSTEM FOR SELECTIVELY REQUESTING DATA FROM A SERVER BASED ON PRIOR ACCEPTED REQUESTS, TRANSMISSION RATE, AND TRANSMISSION CAPACITY

TECHNICAL FIELD OF THE INVENTION

This invention relates in general to computer software, and more particularly to a method and apparatus for downloading data of a Web page from WWW server via the Internet.

BACKGROUND OF THE INVENTION

An example of software for a Web (or WWW) browser which enables access to a Web (or WWW; World Wide Web) server via a network to download data (contents) of a Web (WWW) page held in the Web server is disclosed in PUPA 9-185633 for perusal by a user.

Among such type of browsers, WEBLOCATOR (trademark of Lotus Corporation) is known. This browser has a function for accepting registration of a URL (a unique address of a Web page; uniform resource locator) beforehand and cyclically gets access to Web servers holding Web pages of the registered URL (the phrase "to get access to Web servers holding Web pages of the registered URL" is hereinafter expressed as "to get access to a registered URL", etc., for simplification of description) for automatically obtaining the contents of the Web pages.

Another Web browser, INTERNET EXPLORER 4.0 (trademark of Microsoft Corporation), accesses a preregistered URL to automatically get the content of a Web page of the registered URL (similarly, the phrase "the content of a Web page of the registered URL" is hereinafter expressed as "registered URL content", etc., for simplification of description) in order to periodically update a cache memory (actually, implemented by software using an existing memory rather than a memory specialized for the browser which is provided in a computer on the client side) of the Web browser used for storing the registered URL content.

However, the process of getting and displaying in the foreground, URL content designated by a user is executed asynchronously with a process of automatically getting (in the background) preregistered URL content in these types of Web browsers. Therefore, when a foreground process is executing, a background process may also be started automatically by a timer resulting in a parallel execution of two processes. In this situation, it may take a long time to get user designated content because the two processes may compete with each other due to limited transmission capacity of a communication channel or the processing capacity of a CPU.

Further, because a background process is processed for one URL content at a time even when there is no foreground process, the communication channel may not be effectively utilized in these Web browsers. For example, even when the transmission capacity of the communication channel is 56 kbps, the transmission capacity is mostly wasted and the communication channel can not be utilized effectively if the URL content to be processed in background is transmitted to the client side only at several kbps due to the reason in the Web server side.

SUMMARY OF THE INVENTION

In view of the above described problems, the present invention provides a data communication apparatus and a method thereof which allows a URL user designated content to be obtained and displayed as promptly as possible.

It is also an object of this invention to provide a data communication apparatus and a method thereof which allows a process of getting and displaying a URL content designated by a user to be processed synchronously with a process of getting a URL content registered beforehand without these processes scrambling for resources in the client side.

It is a further object of this invention to provide a data communication apparatus and a method thereof which allows a plurality of URL contents registered beforehand to be obtained in parallel to utilize the transmission capacity of the communication channel effectively and allows many URL contents to be obtained from a Web server for a short time.

In order to achieve the above described objectives, the present invention provides a data communication apparatus connected to one or more data servers via a communication channel having a predetermined transmission capacity, in which each of the data servers comprise: request accepting means for transmitting one or more transmission data items in response to a request from the data communication apparatus and for accepting set up of one or more of the transmission data items which the data server may be possibly requested to transmit; data receiving means for receiving data including the transmission data item from each of the servers via the communication channel; transmission rate monitoring means for monitoring the transmission rate of the received data; first transmission request means for accepting designation of the transmission data and requesting either one of the data servers to transmit said designated transmission data; and second transmission request means for sequentially requesting either one of the data servers to transmit either one of the transmission data items, the set up of which was accepted when the transmission rate obtained by monitoring is within the range of the transmission capacity of the communication channel.

Preferably, the transmission data which each of the data servers transmits to the data communication apparatus is data of a Web page having a unique URL (uniform resource locator), the data server is a Web server which holds and transmits the Web page, the request accepting means accepts a URL indicating either one of the Web pages as information indicating the transmission data which the Web server may possibly be requested to transmit, the first transmission request means receives designation of the URL of an arbitrary Web page and requests either one of the Web servers holding the Web page to transmit the data of the Web page having the designated URL, and the second transmission request means sequentially requests either one of the Web servers holding the Web page to transmit data of the Web page having either one of the URLs, the set up of which was accepted when the transmission rate obtained by monitoring is within the range of the transmission capacity of the communication channel.

Preferably, each of the data servers transmitting the transmission data transmits a respective one of the transmission data items in response to the request from the data communication apparatus, and said second transmission request means disables the request to transmit the transmission data items other than the designated transmission data when requesting either one of the data servers to transmit the designated transmission data.

Preferably, the second transmission request means requests either one of the data servers to transmit next one of the transmission data items when the value of the transmission rate obtained by monitoring is less than a value of the transmission capacity of the communication channel minus a predetermined value.

The data communication apparatus of this invention operates as a Web browser which issues a request to a Web server to transmit a URL content according to a users operation and receives a URL content transmitted from the Web server in response to the request in a client computer which is connected via a data communication channel to a Web server which transmits (transfers) a URL content in response to a request.

In the data communication apparatus of this invention, when the user sets up on a client computer a URL of one or more Web pages to which the user frequently accesses, for example, the request accepting means accepts the set up as a URL content (transmission data) which the user may possibly request the Web server to transmit.

The data receiving means receives a URL content and other data transmitted from the Web server side to the client computer via the communication channel in response to the request.

The transmission rate monitoring means monitors the transmission rate of the data which the data receiving means received via the communication channel, and supplies the transmission rate, obtained as a result of monitoring, to the second transmission request means. When the data receiving means does not receive data other than a URL content, the value of the transmission rate monitored by the transmission rate monitoring means will be the value of the transmission rate per se of the received URL content.

The first transmission request means requests transmission of a URL content designated by the user and performs a foreground process to have the data receiving means receive the URL content.

In other words, when the user designates a URL of a URL content which the user desires to peruse, the first transmission request means requests a Web server which holds the URL content designated by the user to transmit the designated content. The Web server transmits the designated URL content to the client computer in response to the request from the first transmission request means while the data receiving means receives the URL content and displays it on a monitor or stores it in a hard disk, etc.

The second transmission request means performs a background process in which it automatically requests the Web server to transmit the content of the URL, the set up by the user of which was accepted by the request accepting means accepted beforehand, in synchronism with the foreground process to have the data receiving means perform a background process to receive the content.

In other words, the second transmission request means causes operations of these two transmission request means to synchronize by disabling the request to transmit the URL content which has so far been transmitted to the client computer side when the first transmission request means requests the Web server to transmit the URL content designated by the user. By synchronizing the operations of the both means, the second transmission request means causes the URL content designated by the user to be promptly received by the data receiving means without the URL content designated by the user and the URL content so far being transmitted scrambling for the transmission capacity of the communication channel.

The second transmission request means requests a Web server which holds either one of URL contents which the user set up beforehand to transmit the URL content when the URL content designated by the user is not received. The transmission rate monitoring means monitors the transmission rate of the URL content and other data transmitted in response to the request and notifies the second transmission request means of this. The second transmission request means requests a Web server which holds another one of URL contents set up by the user to transmit the URL content only when the value of the notified transmission rate is within a predetermined range which is less than the value of the transmission capacity of the communication channel subtracted by a predetermined value for leaving a margin.

As such, the second transmission request means sequentially requests to transmit URL contents in conformance to the notified transmission rate. When the transmission rate of data including the URL contents received by the data receiving means substantially reaches a limit of the transmission capacity of the communication channel, the second transmission request means provides a background processing by disabling a request to transmit a new URL content to make maximum use of the transmission capacity of the communication channel and causing one or more URL contents to be obtained from the Web server in parallel.

The transmission capacity of the communication channel can be always utilized effectively if the second transmission request means is caused to sequentially request transmission of the URL content set up by the user also when the transmission rate of the URL content which the second Transmission request means requested to transmit is within the predetermined range.

The present invention provides a data communication method in a data communication apparatus connected to one or more data servers via a communication channel having a predetermined transmission capacity, each of the data servers comprising; a request accepting step of transmitting one or more transmission data items in response to a request from the data communication apparatus and accepting set up of one or more the transmission data items which the data server may be possibly requested to transmit, a data receiving step of receiving data including the transmission data item from each of the servers via the communication channel, a transmission rate monitoring step for monitoring the transmission rate of the received data, a first transmission request step for accepting designation of the transmission data and requesting either one of the data servers to transmit the designated transmission data, and a second transmission request step for sequentially requesting either one of the data servers to transmit either one of the transmission data items the set up of which have been accepted when the transmission rate obtained by monitoring is within the range of the transmission capacity of the communication channel.

The present invention provides a recording medium recording a program for use in a data communication apparatus connected to one or more data servers via a communication channel having a predetermined transmission capacity, each of the data servers having recorded therein a program for causing a computer to execute; a request accepting step of transmitting one or more transmission data items in response to a request from the data communication apparatus and accepting set up of one or more the transmission data items which the data server may be possibly requested to transmit, a data receiving step of receiving data including the transmission data item from each of the servers via the communication channel, a transmission rate monitoring step for monitoring the transmission rate of the received data, a first transmission request step for accepting designation of the transmission data and requesting either one of the data servers to transmit the designated transmission data, and a second transmission request step for sequentially requesting either one of the data servers to transmit either one of the transmission data items the set up of which have been accepted when the transmission rate obtained by monitoring is within the range of the transmission capacity of the communication channel.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
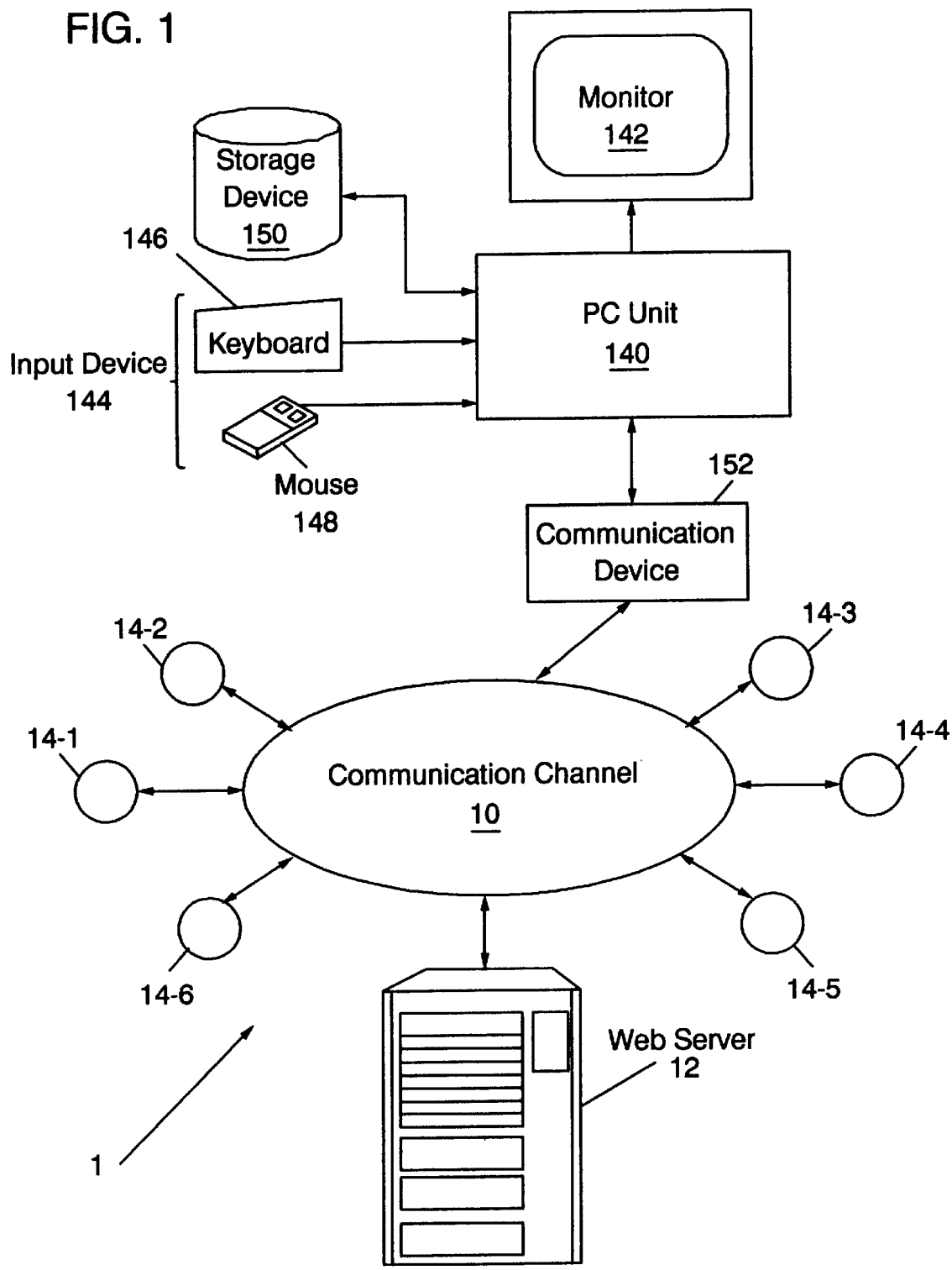
FIG. 1 is a diagram of a configuration of a network system to which the data communication method of the present invention is applied.

FIG. 1 is a diagram of a configuration of a network system 1 to which the data communication method of this invention is applied. As shown in FIG. 1, the network system 1 comprises k Web servers 12-1 to 12-k and m client computers 14-1 to 14-m (where k and m are integers and FIG. 1 shows an example where k=1 (i.e., web server 12) and m=6 (i.e., client computer 14-1, 14-2, 14-3, 14-4, 14-5 and 14-6) for the purpose of simplifying the figure and description) interconnected via a communication channel 10.

The network system 1 is the internet or an intranet, for example, and is configured with these components to transmit data (content) of a Web page from a Web server 12 (Web servers 12-1 to 12-k will be simply referred to as a Web server 12 hereunder) to a client computer 14-i (client computers 14-1 to 14-m will be referred to as a client computer 14-i hereunder when any of them is shown without being specified) in response to a user operation.

The communication channel 10 is a leased data communication channel, an ISDN communication channel, a LAN or a public telephone channel allowing data transmission, for example, and transmits contents and communication control data between a Web server 12 and a client computer 14-i.

The Web server 12 stores and holds contents of a large amount of Web pages to each of which an address called a unique URL (uniform resource locator) is assigned in a storage device such as a hard disk device (HDD) or a magneto-optical (MO) disk device (not shown), etc.

The Web server 12 also reads out contents of Web pages (hereinafter called "URL content") which are assigned designated URLs from the stored contents in response to a request from a client computer 14-i and sends the read out contents to the client computer 14-i via the communication channel 10.

As shown in FIG. 1, the client computer 14 is a personal computer provided with a data communication function, for example, and comprises a computer (PC) unit 140 including a general purpose CPU, a memory and peripheral circuits therefor, a monitor 142 such as a CRT display device or a liquid crystal display device, an input device 144 including a keyboard 146 and a mouse 148, a storage device 150 such as a hard disk device or a magnet-optical disk device, and a communication device 152 such as a modem or a TA (terminal adapter).

Figure 2:
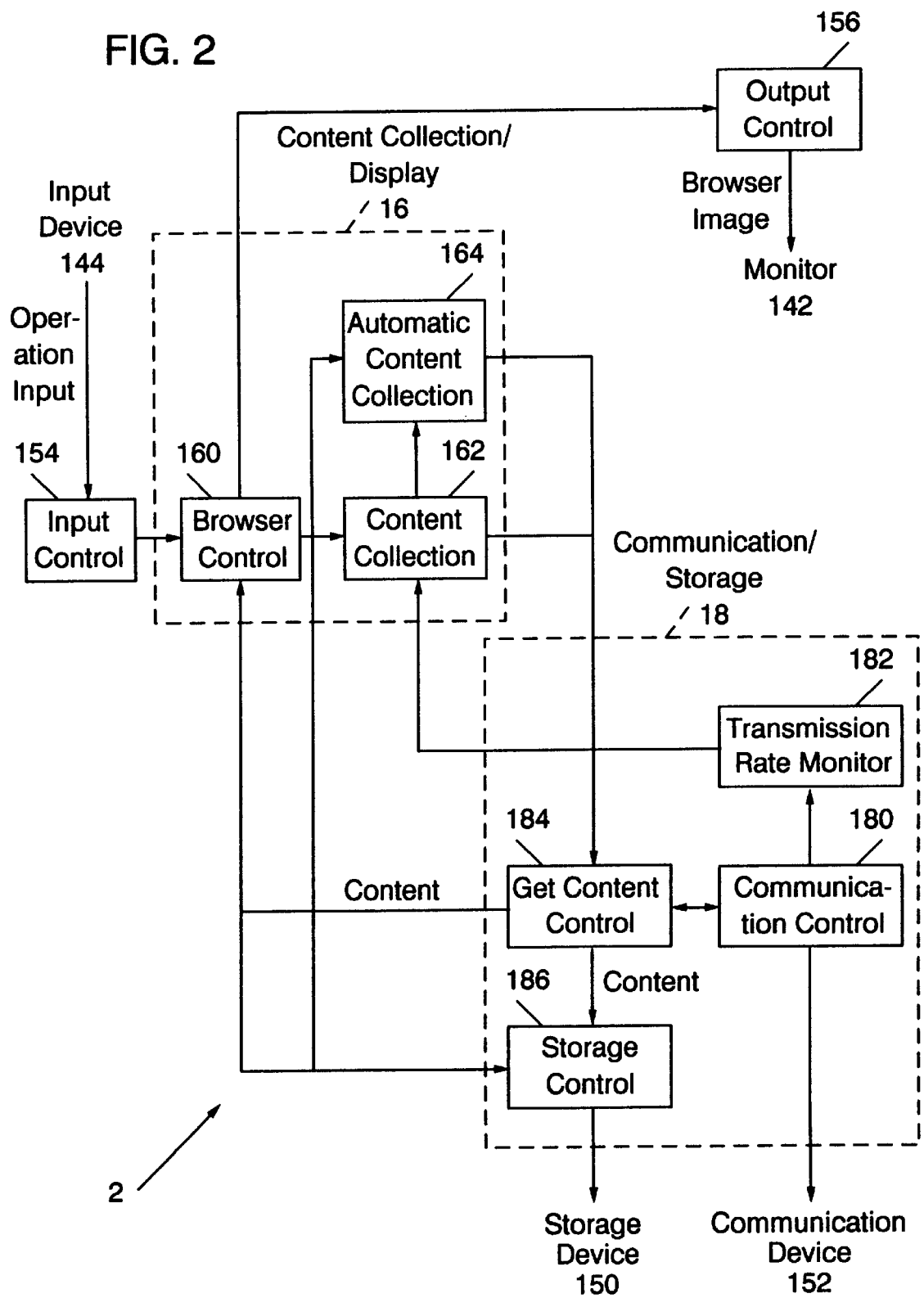
FIG. 2 is a diagram showing a configuration of communication software which is executed in a client computer as shown in FIG. 1 to implement the data communication method of the present invention.

FIG. 2 shows a configuration for communication software 2 which is executed in the computer unit 140 of the client computer 14-i shown in FIG. 1 to implement the data communication method of this invention.

As shown in FIG. 2, the communication software 2 comprises an input control part 154, a content collection/display part 16, a communication/storage part 18 and an output control part 156. The content collection/display part 16 comprises a browser control part 160, a content collection part 162 and an automatic content collection part 164. The communication/storage part 18 comprises a communication control part 180, a transmission rate monitor part 182, a get content control part 184 and a storage control part 186. The communication software 2 is stored in a storage device 150 and read out to a memory of the computer unit 140 for execution to perform a process as a so called browser software as shown below.

With these components, the communication software 2 accepts designation of a URL from a user via the input device 144 in a manner similar to conventional browser software, gets an access (access to URL) to a Web server 12 holding the URL content, requests to send the content, and receives the content sent from the Web server 12 via the communication channel 10 in response to the request for display on the monitor 142 or storage in the storage device 150 (foreground process).

The communication software 2 also receives a setting of a URL of one or more Web pages which are automatically collected from the Web server 12 via the input device 144, sequentially requests transmission of the contents of the Web pages having URLs set up one at a time, and automatically gets the content of one or more Web pages within a range permitted by the transmission capacity between the communication channel 10 and the client computer 14-i (background processing).

In order to clearly distinguish a URL content collected in the foreground process from a URL automatically collected in the background process, the URL content collected according to URL designation by a user in the foreground process is called a foreground URL content while the URL content which is set up beforehand by a user and automatically collected in the background process is called a background URL content.

In the communication software 2, the input control part 154 receives user operation of a URL designation, etc., via the input device 144 and outputs the received operation to the browser control part 160.

The browser control part 160 of the content collection/display part 16 outputs the URL designated by the user via the input control part 154 to the content collection part 162 and gets a foreground URL content from the Web server 12 in the foreground process. The browser control part 160 also controls the get content control part 184 or the storage control part 186 of the communication/storage part 18 to receive the content of the foreground URL and displays the designated content supplied on the monitor 142 via the output control part 156.

The browser control part 160 also receives the URL set up of background URL contents to be automatically collected in the background process via the input control part 154 and controls the storage control part 186 to have the received URL stored in the storage device 150. When the user designates the background URL which was automatically obtained in the background process, the browser control part 160 controls the get content control part 184 or the storage control part 186 to have them supply the designated background URL and displays the supplied background URL content on the monitor 142 via the output control part 156.

The content collection part 162 controls operations in the foreground and the background processes of the components of the communication software 2. Specifically, the content collection part 162 outputs the URL of the foreground URL content designated by the user to the get content control part 184 and controls it to have it collect the foreground URL content from the Web server 12 in the foreground process.

When the user designates a foreground URL content during the time when the background URL contents are being collected by the background process, and when the transmission rate (TD) inputted from the transmission rate monitoring part 182 exceeds a predetermined threshold (C−α), which will be subsequently described in greater detail, the content collection part 162 controls the automatic content collection part 164 to inhibit issuance of a new HTTP_GET_Request signal (to be described later with reference to FIG. 6) to the Web server 12 and have the automatic content collection part 164 collect only the background URL contents transmitted in response to the HTTP_GET_Request signal which has been issued at that point of time.

As such, during the time when the content collection part 162 causes the automatic content collection part 164 to inhibit issuance of a new HTTP_GET_Request signal, it is unable to collect the background URL contents other than ones returned in response to the HTTP_GET_Request signal which had been issued before issuance was inhibited. Accordingly, collection of the background URL contents by the automatic content collection part 164 is essentially inhibited by inhibiting issuance of a new HTTP_GET_Request signal by the automatic content collection part 164.

When the transmission rate (TD) does not exceed the threshold value (C−α), the content collection part 162 releases the automatic content collection part 164 from inhibition of collecting a new background URL content.

The threshold value (C−α) is the transmission capacity C between the communication channel 10 and the client computer 14-i subtracted by a margin value a which is required for preventing an inexpedience which may occur when the transmission rate TD of the URL contents consumes all the transmission capacity C in transmitting the URL contents to the client computer 14-i, or for reserving for a data traffic other than URL contents. When the transmission capacity C leaves no margin from the transmission rate TD, an expedience may be resulted in that the client computer 14-i becomes unable to normally receive the URL contents if the transmission rate TD temporarily exceeds the transmission capacity C.

The automatic content collection part 164 controls the storage control part 186 to have it supply a URL of a background URL content stored in the storage device 150. If there exists a background URL content which has not been collected and if initiation of collecting a new background URL content is not inhibited by the content collection part 162, the automatic content collection part 164 outputs a URL of either one of background URL contents which have been supplied but not collected sequentially to the get content control part 184 and controls it to have it collect the background URL contents corresponding to the outputted URL.

Figure 3:
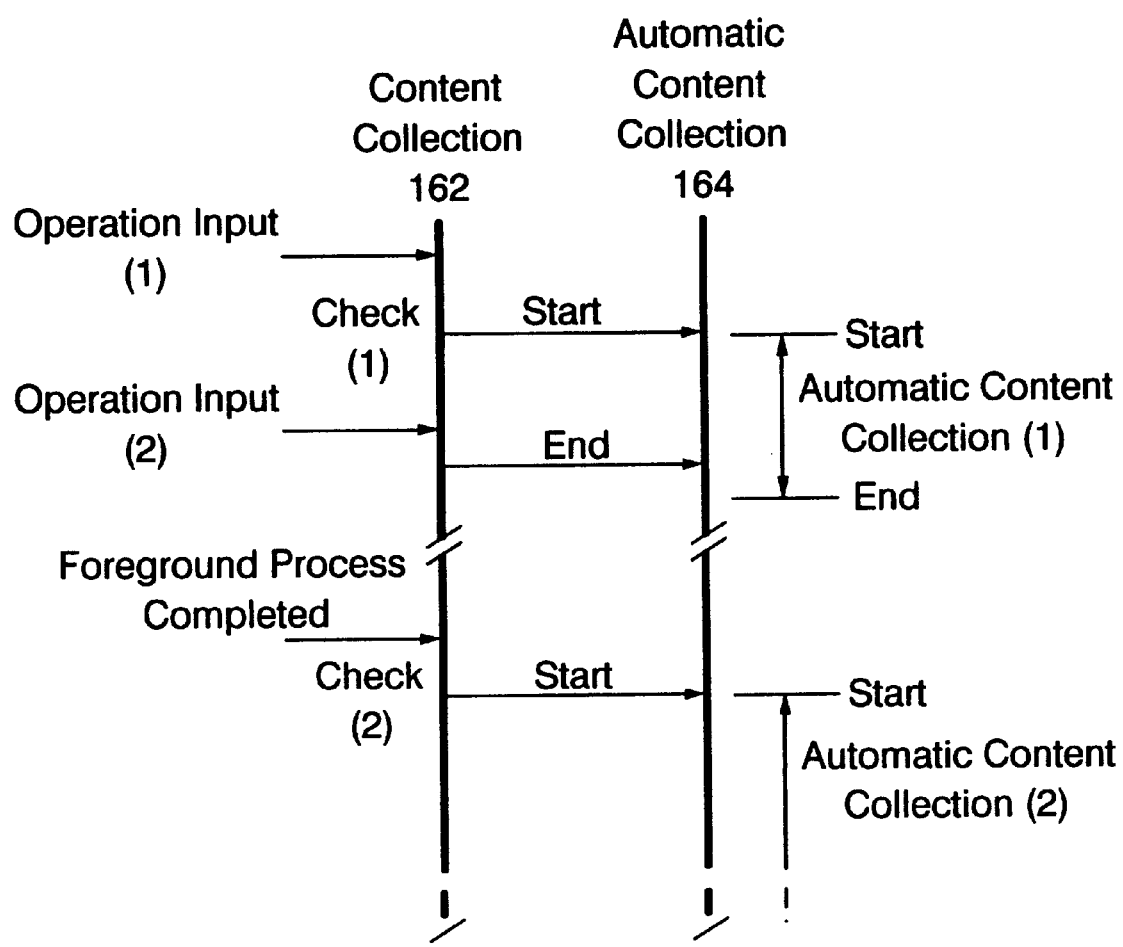
FIG. 3 illustrates the control which a content collection part effects on an automatic content collection part.

Control which the content collection part 162 effects on the automatic content collection part 164 is now described by way of a specific example. FIG. 3 is a diagram illustrating the control which the content collection part 162 effects on the automatic content collection part 164.

As shown in FIG. 3, when the user operates the input device 144 (FIG. 1) to start the communication software 2 (FIG. 2), the operation is inputted to the browser control part 160 which in turn controls the content collection part 162 according to users operation (operation input (1)). The content collection part 162 compares the value of the transmission rate (TD) inputted from the transmission rate monitoring part 182 with the value of the threshold (C−α).

Since the communication software 2 has just started, the value of the transmission rate TD is 0, satisfying the condition TD<C−α (check (1)). Accordingly, the content collection part 162 starts the automatic content collection part 164 to start a background process. The automatic content collection part 164 starts the background process according to the control by the content collection part 162 to collect background URL contents which were set up beforehand automatically from the Web server 12 (automatic content collection (1)).

When the user effects an operation to designate a foreground URL content to the client computer 14-i at certain point of time, the operation is inputted to the browser control part 160. The browser control part 160 controls the content collection part 162 according to users operation to have it start the foreground process (operation input (2)). In foreground processing, the content collection part 162 controls the automatic content collection part 164 to have it terminate the background process as described in the above.

When the foreground process is completed, the content collection part 162 compares the value of the transmission rate (TD) inputted from the transmission rate monitoring part 182 with the value of the threshold (C−α) (check (2)) and controls the automatic content collection part 164 when the condition TD<(C−α) is satisfied to have it resume the background process (automatic content collection (2)).

The get content control part 184 requests the Web server 12 to transmit a background URL content and a foreground URL content via the communication control part 180 according to the control by content collection part 162 and the automatic content collection part 164, receives these URL contents transmitted from the Web server 12 in response to the request via the communication control part 180, and outputs the received URL contents to the browser control part 160 or stores them in the storage device 150 via the storage control part 186.

The storage control part 186 stores the URL content received by the get content control part 184 in the storage device 150 according to the control by the get content control part 184 and reproduces the stored URL content for output to the browser control part 160 according to the control by the browser control part 160. The storage control part 186 also stores a URL corresponding to the background URL content which was set up by the user and outputs the stored URL to the browser control part 160 according to the control by the browser control part 160.

The communication control part 180 controls the communication device 152 to effect a communication control between the communication channel 10 and the Web server 12. Specifically, when the get content control part 184 starts to collect URL contents, the communication control part 180 controls the communication device 152 to establish a communication channel to the Web server 12 and sends a command "HTTP GET REQUEST" requesting to transmit URL contents.

The communication control part 180 also receives URL contents transmitted from the Web server 12 and outputs the received URL contents to the get content control part 184. The communication control part 180 also outputs the data length of the URL contents outputted to the get content control part 184 sequentially to the transmission rate monitoring part 182.

The transmission rate monitoring part 182 measures the transmission data rate TD of the URL content transmitted from the Web server 12 in sequence based on the quantity of data of the URL contents inputted from the communication control part 180 and outputs the value of the transmission data rate TD obtained as a result of the measurement to the content collection part 162.

Figure 4:
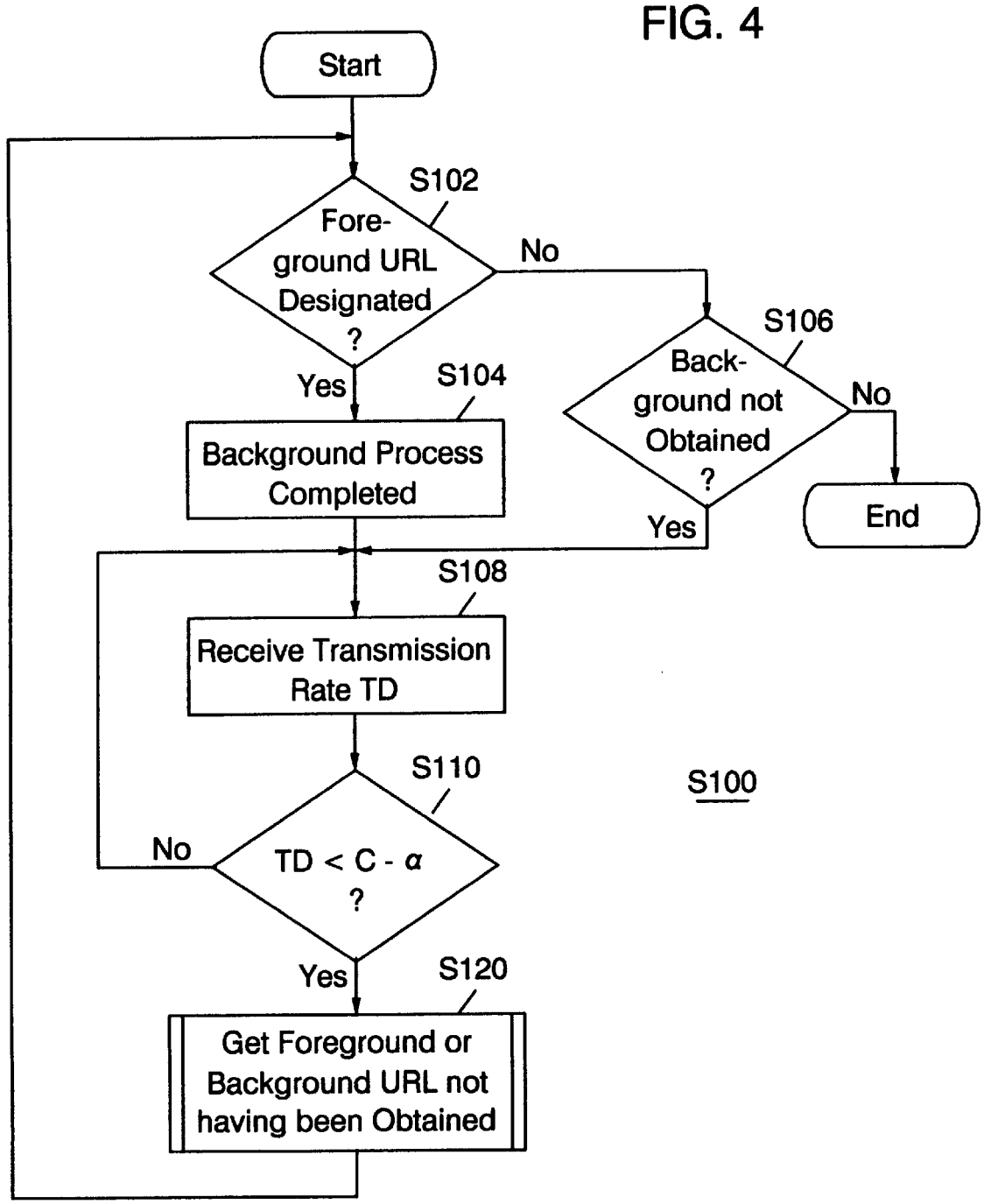
FIG. 4 is a flow chart showing operation of the communication software shown in FIG. 2.

The operation of the network system 1 is now described with reference to FIGS. 4, 5, and 6. As shown in FIG. 4, in step 102 (S102), the content collection part 162 determines whether or not the user designated a foreground URL and the proceeds to the process of SI 04 when a foreground URL content m has been designated and collection of the designated foreground URL content has not begun. Otherwise it proceeds to the process of S106.

In step 104 (S104), the content collection part 162 inhibits the automatic content collection part 164 from sending a command "HTTP GET Request Chain" (to be described later with reference to FIG. 5) which requests to newly send a background URL content to the Web server 12 and terminates acquisition of the background URL content (background process).

In step 106 (S106), the automatic content collection part 164 determines whether or not there remains a background URL content which has not been obtained (background URL not obtained) and proceeds to the process of S108 if there is a background URL content not obtained. If there is none, the process is terminated.

In step 108 (S108), the content collection part 162 receives a transmission rate TD at that point of time from the transmission rate monitoring part 182. In step 110 (S110), the content collection part 162 determines whether or not the transmission rate is equal to the threshold value (C−α) and proceeds to the process of S120 shown in FIG. 5 if TD<C−α. If TD is not less than C−α, it returns to the process of S108.

Figure 5:
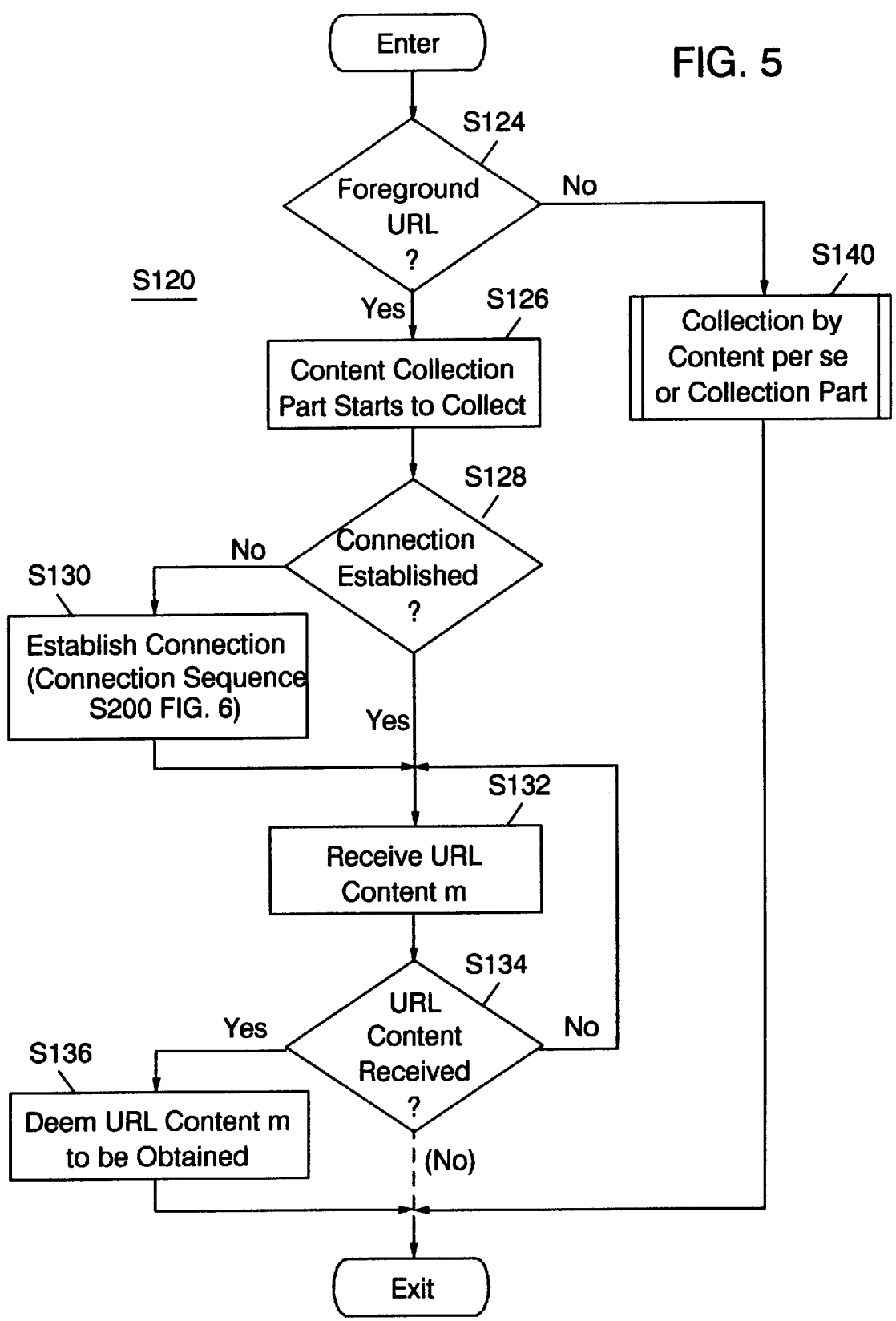
FIG. 5 is a flow chart showing a get process of a URL content shown in FIG. 4.

As shown in FIG. 5, S120 is further defined. In step 124 (S124), the content collection part 162 determines whether or not the URL content m not obtained which is to be requested to the Web server 12 to transmit is a foreground URL content. If the URL content m not obtained is a foreground URL content, the content collection part 162 proceeds to the process of S126. Otherwise (the URL content m not obtained is a background URL content) it proceeds to the process of S140.

In step 126 (S126), the content collection part 162 starts collection of the foreground URL contents (foreground process). In step 128 (S128), the content collection part 162 determines whether or not a connection to the Web server (when there are a plurality of Web servers 12, connection to either one of Web servers which hold foreground URL contents) has been established and proceeds to the process of S132 if the connection has been established. If the connection has not been established, it proceeds to the process of S130.

In step 130 (S130), the content collection part 162 establishes a connection to the Web server 12. Specifically, as shown as a connection sequence S200 in FIG. 6, the content collection part 162 (content collection/display part 16) issues a URL object creation command and a URL connection command (Create URL_Object, Connect_URL) to the get content control part 184 (communication/storage part 18) (S202).

The get content control part 184 sends Socket Open signal to the Web server 12 via the communication control part 180 in response to the command from the content collection part 162 (S204) while the Web server 12 returns an Accept signal in response to the signal from the get content part 184 (S206). A connection is established between the Web server 12 and the client computer 14-I by the above processes (S208).

In step 132 (S132) of FIG. 5, the content collection part 162 receives the foreground URL content m from the Web server 12. Specifically, as shown as a URL get content sequence S220 in FIG. 6, the content collection part 162 (content collection/display part 16) issues a get URL (get_URL) command to the get content control part 184 (communication/storage part 18) (S222).

The get content control part 184 sends HTTP_GET_Request signal sequentially to the Web server 12 via the communication control part 180 in response to the command from the content collection part 162 (HTTP_Request_chain, "chain" means that multiple "HTTP_GET_Request" signals are chained; S224) while the Web server 12 sequentially returns HTTP_Response signals each containing a foreground URL content m in response to the HTTP_GET_Request signal from the client computer 14-I (HTTP_Response_chain, "chain" means that multiple "HTTP_Response" signals are chained; S226).

The communication control part 180 receives HTTP_Response_chain from the Web server 12 and separates the foreground URL content to output it to the get content control part 184. When the content collection part 162 issues a get_Status_Code command to the get content control part 184 (S228), the get content control part 184 returns a status code to the effect that it has or has not received the foreground URL content m in response to the command (S230).

When the status code received from the get content control part 184 indicates that it has received a foreground URL content m, the content collection part 162 issues a get_Data command to the get content control part 184

(S232) which, in turn, outputs the received foreground URL content m (data) to the browser control part 160 (content collection/display part 16) and/or the storage control part 186 in response to the get data command (S234).

The browser control part 160 displays the content of the foreground URL content inputted from the get content control part 184 on the monitor 142, etc., via the output control part 156, or the storage control part 186 stores the inputted foreground URL content in the storage device 150.

In step 134 (S134) of FIG. 5, the content collection part 162 determines whether or not all foreground URL contents m have been received and proceeds to the process of S136 if they have been received. If all of them have not received, it returns to the process of S132.

When the background URL contents are collected after collection of the foreground URL contents m is initiated, the content collection part 162 starts to collect the foreground URL contents and immediately goes out of the process of S120, returning to the process of S102 in FIG. 4.

In step 136 (S136), the content collection part 162 deems the all foreground URL contents m which have been received to be URL contents which have been collected. By treating the foreground URL contents m as ones which have been obtained after the process of S134 in this manner, the processes of S126 to S136 will not be executed unless the user designates a next foreground URL content M+1.

In step 140 (S140), the automatic content collection part 164 performs similar processes to the above described S126 to S136 to get background URL contents in sequence. Specifically, the automatic content collection part 614 gets background URL contents which were set up beforehand via the storage control part 186 in a manner similar to the process of S126 and starts collection of background URL contents which have been set up but not collected (background process).

The automatic content collection part 614 determines whether or not a connection to the Web server 12 has been established (when multiple Web servers are involved, a connection to either one of the Web servers 12 which holds background URL contents) in a manner similar to the process of S128. When the connection has not been established, the content automatic collection part 614 sends and receives the signal shown in the connection sequence S200 (FIG. 6) to and from the Web server 12 to establish the connection in a manner similar to the process of S130.

Figure 6:
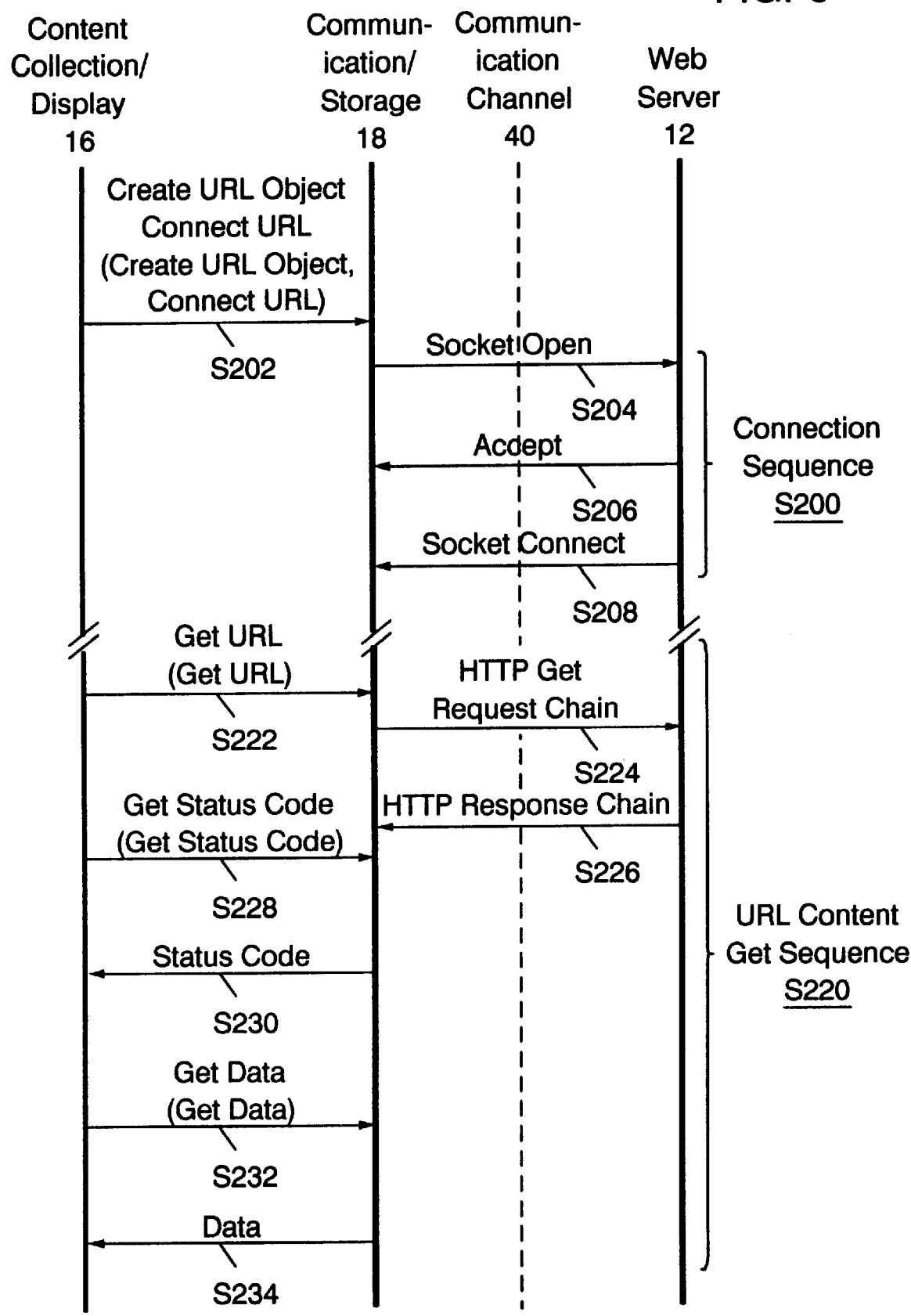
FIG. 6 is a signal sequence chart among a content collection/display part, a communication/storage part shown in FIG. 2 and a Web server shown in FIG. 1.

Next, the content automatic collection part 614 sends and receives the signal shown in the get URL content sequence S220 of FIG. 6 to and from the get content control part 184 and the Web server 12 in a manner similar to the process of S132 and causes the get content control part 184 to receive a background URL content m from the Web server 12.

Finally, the automatic content collection part 164 determines whether or not all background URL contents m have been received in a manner similar to the process of S134. When they have been received, the automatic content collection part 164 treats the background URL contents as having been obtained in the manner similar to the process of S136 while, if they have not been received, it goes out of the process of S120 as shown by the dotted line in FIG. 5 and returns to the process of S102 in FIG. 4.

The background URL contents m which the automatic content collection part 164 started to collect in the process of S140 continue to be collected even when the content collection part 162 starts the process following S102 (FIG. 4). Specifically, even when collection of new background URL contents m+1 is initiated in the process following S102, collection of the background URL contents m is executed in parallel with collection of the background URL contents m+1.

Figure 7A:
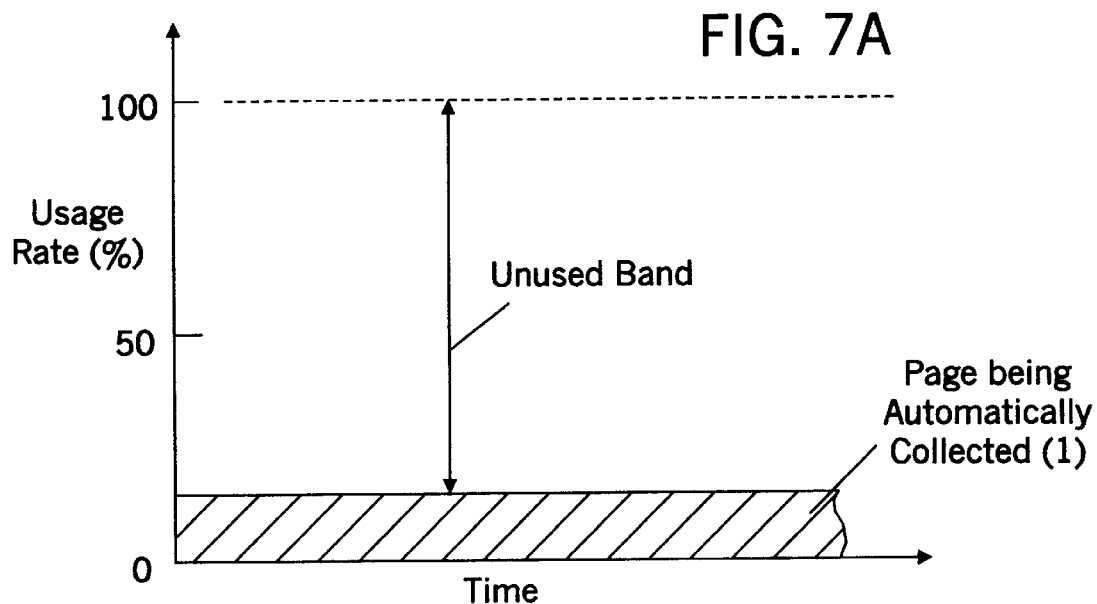
FIG. 7A is a chart showing channel usage rate for a case where URL contents are automatically collected in a background processing using a conventional technique.
Figure 7B:
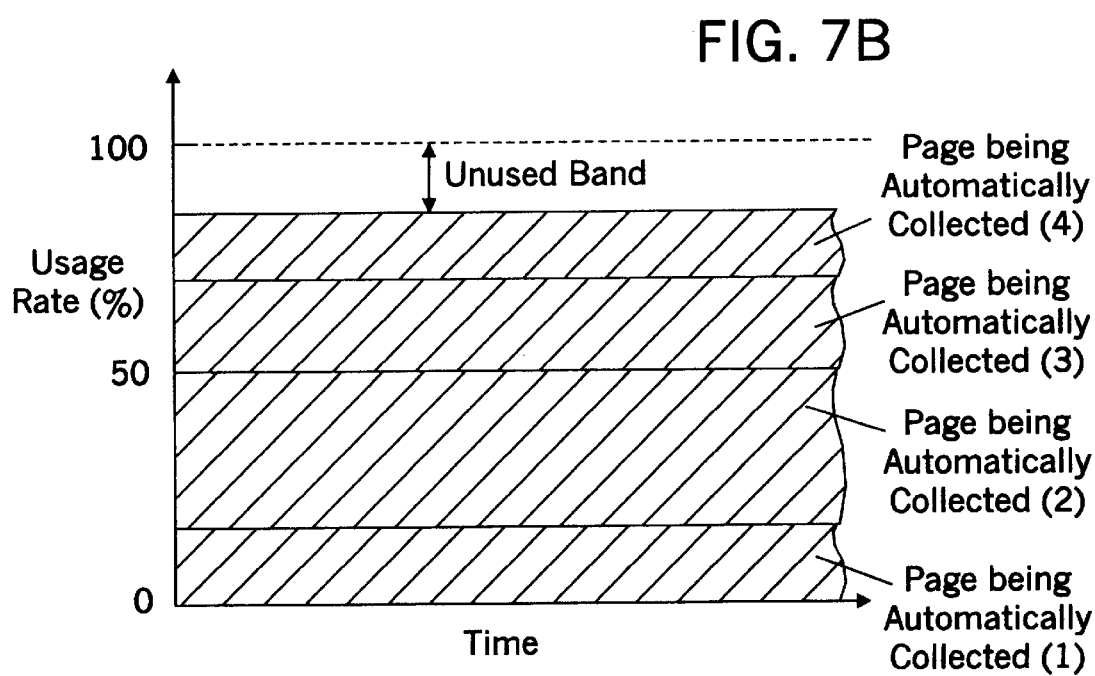
FIG. 7B is a chart showing channel usage rate for a case where background URL contents (page) are automatically collected according to the data communication method of the present invention.

The manner in which the URL contents are transmitted from the Web server 12 to the client computer 14-I by the above described process is now explained hereunder. FIG. 7A is a chart showing the channel usage rate for a case where URL contents are automatically collected in a background processing using a conventional technique while FIG. 7B is a chart showing the channel usage rate for a case where background URL contents (page) are automatically collected according to the data communication method of this invention.

As shown in FIG. 7A, because only one background URL content is automatically collected by the background processing of the conventional technique, only a portion of the transmission capacity between the communication channel 10 and the client computer 14-I is used for the background process, resulting in a very low channel usage rate.

On the other hand, according to the data communication method of this invention, a plurality of background URL contents are collected to the extent that the rest of the transmission capacity between the communication channel 10 and the client computer 14-I is kept above the threshold value (C−α) so that the channel usage rate is greatly improved over the background process of the conventional technology. Accordingly, the data communication method of this invention allows a large number of background URL contents to be collected in a short time when compared to the conventional technology.

Figure 8A:
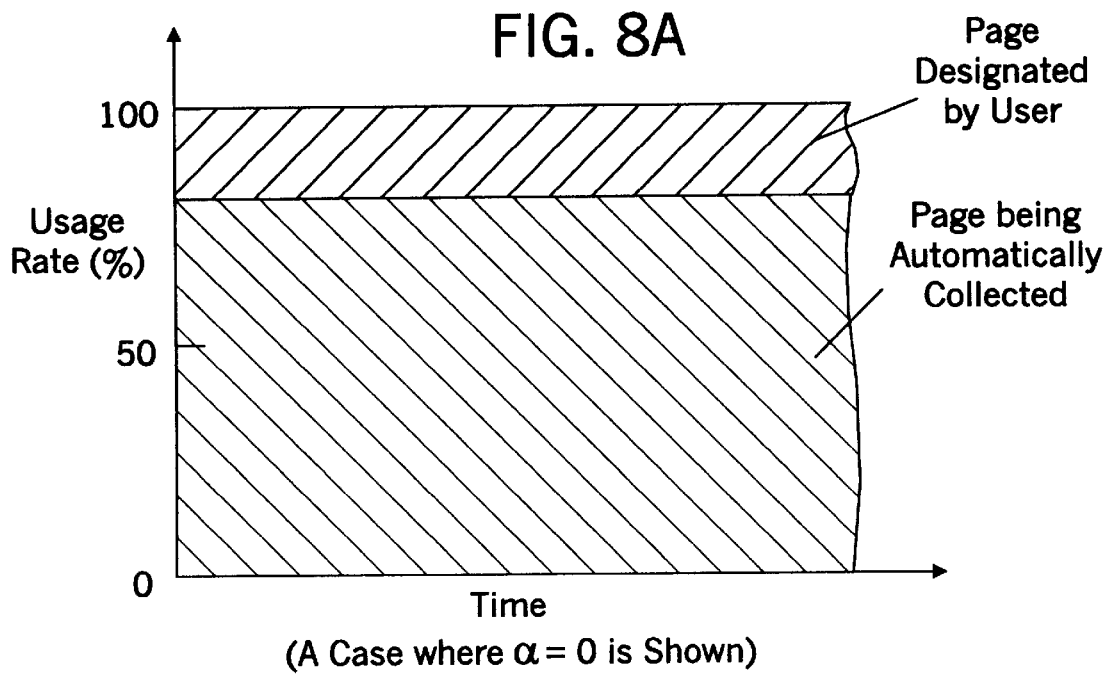
FIG. 8A is a chart showing channel usage rate for a case where foreground URL contents designated by a user are collected using a conventional technique.
Figure 8B:
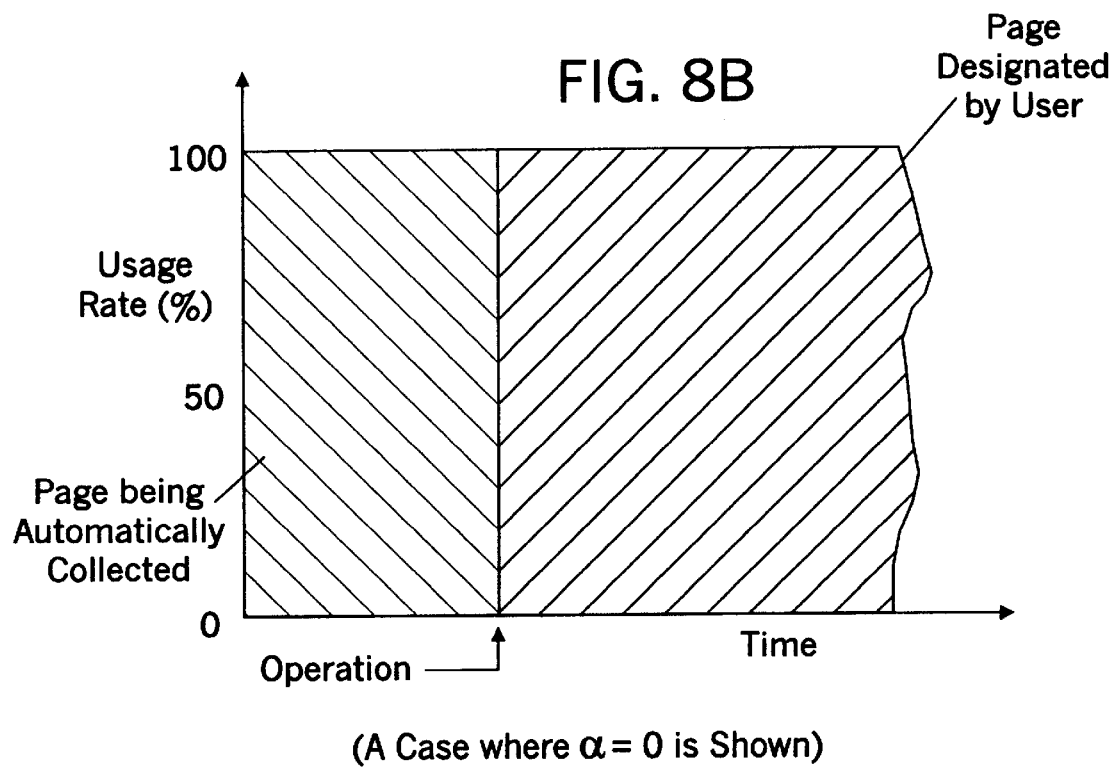
FIG. 8B is a chart showing channel usage rate for a case where foreground URL contents (page) designated by a user are collected according to the data communication method of the present invention.

FIG. 8A is a chart showing the channel usage rate for a case where foreground URL contents designated by a user are collected using a conventional technique. FIG. 8B is a chart showing the channel usage rate for a case where foreground URL contents (page) designated by a user are collected according to the data communication method of this invention. FIGS. 8A and 8B give an example where the threshold value=C (α=0).

As shown in FIG. 8A, because collection of foreground URL contents designated by a user is done in parallel with automatic collection of background URL contents in the conventional background process, the transmission capacity between the communication channel 10 and the client computer 14-I which is effectively used for collecting the foreground URL contents is very small. Therefore, it takes a long time from the time when the user designates the foreground URL contents to the time when they are collected and displayed.

On the other hand, according to the data communication method of this invention, when the user designates foreground URL contents, automatic collection of background URL contents which has been so far continued is stopped as shown in FIG. 8B so that foreground URL contents can be collected using full transmission capacity between the communication channel 10 and the client computer 14-I. Accordingly, it takes a shorter time from the time when the user designates the foreground URL contents to the time when they are collected and displayed.

Figure 9:
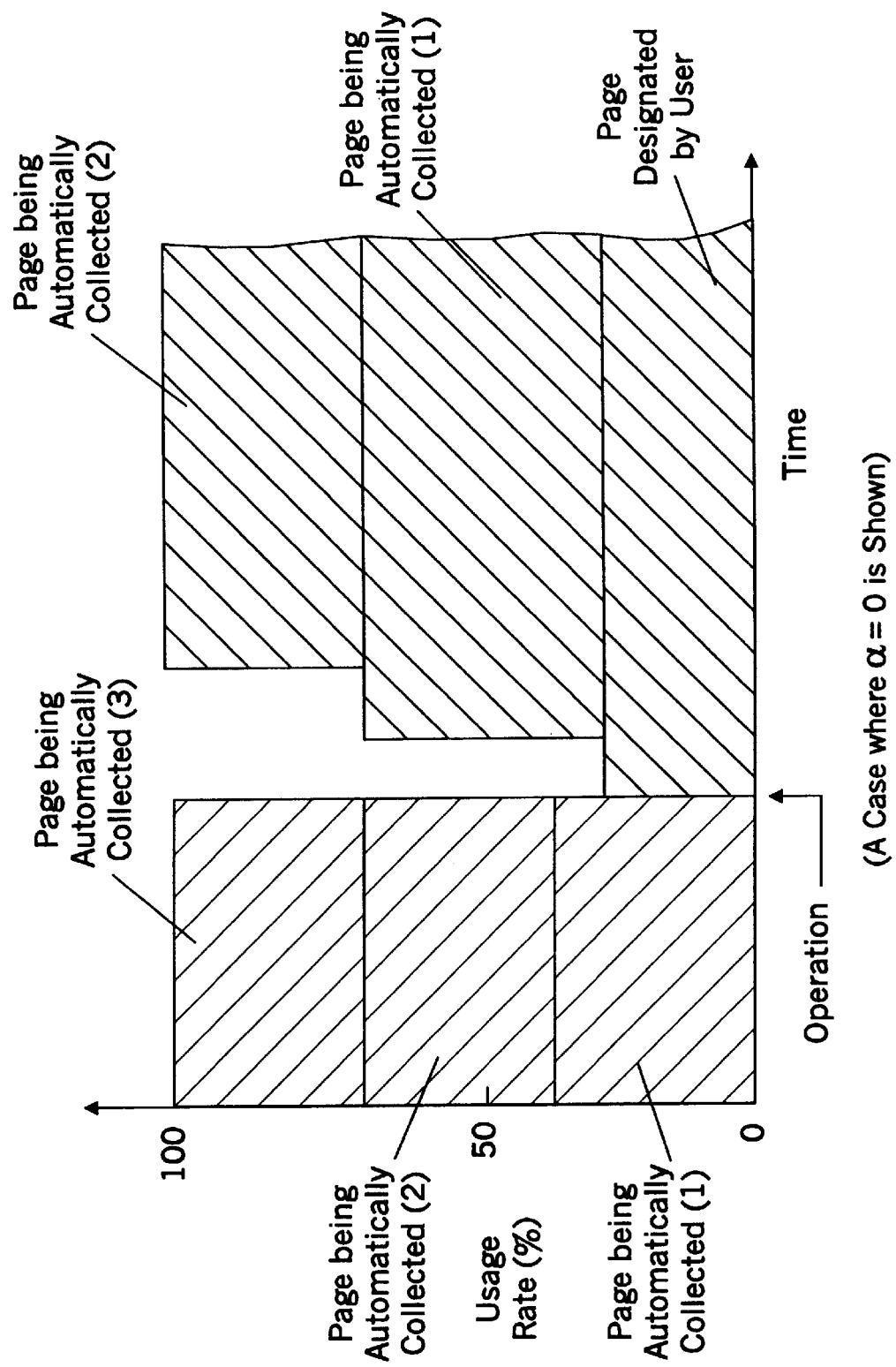
FIG. 9 is a chart showing URL contents (pages) transmitted to a Web server when a foreground process runs in parallel with a background process.

FIG. 9 is a chart showing URL contents (pages) transmitted to the Web server 12 when a foreground process runs in parallel with a background process. FIG. 9 shows an example where α=0 (threshold value=C).

The process of the content collection part 162 may be so modified as to execute a foreground process and a background process in parallel subject to a condition TD<C−α during the foreground process. Specifically, the process of the communication software 2 may be so modified as to stop collection of the foreground URL contents [page (1)–(3)] which has been so far effected automatically when the user designates a foreground URL and sequentially resume collection of the background URL contents using the rest of the transmission capacity between the Web server 12 and the communication channel 10 after starting collection of the foreground URL contents (pages selected by the user).

Further, when a background URL is designated by the user, the communication software 2 treats the designated background URL contents as foreground URL. It should be understood that a background URL contents may overlap a foreground URL contents in this manner. Also, when the communication software 2 is so modified as to collect background URL contents after collection of foreground URL contents m is initiated, the process of the content collection part 162 may be so modified as to go out of the process of S120 immediately after initiating collection of foreground URL contents and return to the process of S102 as shown by the dotted line in FIG. 5.

As described in the above, according to the data communication apparatus and method, a URL content designated by a user can be obtained and displayed as promptly as possible. Further, according to the data communication apparatus and method, a process of getting and displaying a URL content designated by a user can be processed synchronously with a process of getting a URL content registered beforehand without these processes scrambling for resources in the client side.

Further, according to the data communication apparatus and method, a plurality of URL contents registered beforehand can be obtained in parallel to utilize the transmission capacity of the communication channel effectively and a large number of URL contents can be obtained from a Web server for a short time.

Although the present invention has been described with respect to a specific preferred embodiment thereof, various changes and modifications may be suggested to one skilled in the art and it is intended that the present invention encompass such changes and modifications as fall within the scope of the appended claims.

What we claim is:

1. A data communication apparatus connected to at least one data server via a communication channel having a predetermined transmission capacity, the apparatus comprising:

means for accepting a request for at least one transmission data item which the at least one data server may be requested to transmit;

means for receiving data from the at least one server via the communication channel;

means for monitoring a transmission rate of data received via the communication channel;

first transmission request means for accepting a designation of transmission data and for requesting the at least one data server to transmit the transmission data corresponding to the designation via the communication channel; and second transmission request means for selectively requesting the at least one transmission data item from the data server corresponding to accepted requests for the at least one transmission item if the transmission rate obtained by the means for monitoring is within the predetermined transmission capacity of the communication channel.

2. A method for communicating with at least one data server via a communication channel having a predetermined transmission capacity, comprising:

accepting a request for at least one transmission data item which the at least one data server may be requested to transmit;

receiving data from the at least one server via the communication channel;

monitoring a transmission rate of data received via the communication channel;

accepting a designation of transmission data and for requesting the at least one data server to transmit the transmission data corresponding to the designation via the communication channel; and selectively requesting the at least one transmission data item from the data server corresponding to accepted requests for the at least one transmission item if the transmission rate obtained by the means for monitoring is within the predetermined transmission capacity of the communication channel.

3. A computer program product for communicating with at least one data server via a communication channel having a predetermined transmission capacity, comprising:

a computer readable storage media having computer readable program code embodied therein, the computer readable program code comprising:

computer readable program code which accepts a request for at least one transmission data item which the at least one data server may be requested to transmit;

computer readable program code which receives data from the at least one server via the communication channel;

computer readable program code which monitors a transmission rate of data received via the communication channel;

computer readable program code which accepts a designation of transmission data and for requests the at least one data server to transmit the transmission data corresponding to the designation via the communication channel; and computer readable program code which selectively requests the at least one transmission data item from the data server corresponding to accepted requests for the at least one transmission item if the transmission rate obtained by the means for monitoring is within the predetermined transmission capacity of the communication channel.

4. A method of controlling requests for data over a communication channel having a transmission capacity, the method comprising:

categorizing requests for data over the communication channel into at least a first category and a second category, wherein the requests in the second category are queued for transmission over the communication channel;

monitoring a data rate of communications over the communication channel transmitting the requests for data over the communication channel; and preventing the transmission of requests over the communication channel in the second category based on an availability of a request in the first category for transmission over the communication channel, the monitored data rate of the communication channel and the transmission capacity of the communication channel.

5. A method according to claim 4, wherein the first category of requests comprise requests which are carried out in a foreground process and wherein the second category of requests comprise requests which are carried out in a background process.

6. A method according to claim 5, wherein the requests comprise Universal Resource Locators (URLs).

7. A method according to claim 6, wherein the requests in the second category comprise frequently visited URLs which are retrieved in a background process and wherein the requests in the first category comprise URLs which are to be retrieved in a foreground process.

8. A method according to claim 4, wherein the step of preventing the transmission of requests comprises the steps of:
  comparing the monitored data rate to the transmission capacity of the communication channel; and
  preventing the transmission of requests over the communication channel in the second category if the requested data associated with a request in the first category has not been received and based on the comparison of the monitored data rate and the transmission capacity and a threshold associated with the transmission capacity.

9. A method according to claim 8, further comprising the step of allowing the transmission of requests over the communication channel in the second category if there are no requests in the first category, all data has been received for requests of the first category or the monitored data rate is not greater than the threshold associated with the transmission capacity.

10. A method according to claim 9, wherein the threshold associated with the transmission capacity comprises the transmission capacity minus a value.

11. A system for controlling requests for data over a communication channel having a transmission capacity, comprising:
  means for categorizing requests for data over the communication channel into at least a first category and a second category, wherein the requests in the second category are queued for transmission over the communication channel;
  means for monitoring a data rate of communications over the communication channel;
  means for transmitting the requests for data over the communication channel; and
  means for preventing the transmission of requests over the communication channel in the second category based on an availability of a request in the first category for transmission over the communication channel, the monitored data rate of the communication channel and the transmission capacity of the communication channel.

12. A system according to claim 11, wherein the first category of requests comprise requests which are carried out in a foreground process and wherein the second category of requests comprise requests which are carried out in a background process.

13. A system according to claim 12, wherein the requests comprise Universal Resource Locators (URLs).

14. A system according to claim 13, wherein the requests in the second category comprise frequently visited URLs which are retrieved in a background process and wherein the requests in the first category comprise URLs which are to be retrieved in a foreground process.

15. A system according to claim 11, wherein the means for preventing the transmission of requests comprises:
  means for comparing the monitored data rate to the transmission capacity of the communication channel; and
  means for preventing the transmission of requests over the communication channel in the second category if the requested data associated with a request from the first category has not been received and based on the comparison of the monitored data rate and the transmission capacity and a threshold associated with the transmission capacity.

16. A system according to claim 15, further comprising means for allowing the transmission of requests over the communication channel in the second category if there are no requests of the first category, all data has been received for requests of the first category or the monitored data rate is not greater than the threshold associated with the transmission capacity.

17. A system according to claim 15, wherein the threshold associated with the transmission capacity comprises the transmission capacity minus a value.

18. A computer program product for controlling requests for data over a communication channel having a transmission capacity, comprising:
  a computer readable storage media having computer readable program code embodied therein, the computer readable program code comprising:
  computer readable program code which categorizes requests for data over the communication channel into at least a first category and a second category, wherein the requests in the second category are queued for transmission over the communication channel;
  computer readable program code which monitors a data rate of communications over the communication channel;
  computer readable program code which transmits the requests for data over the communication channel; and
  computer readable program code which prevents the transmission of requests over the communication channel in the second category based on an availability of a request of the first category for transmission over the communication channel, the monitored data rate of the communication channel and the transmission capacity of the communication channel.

19. A computer program product according to claim 18, wherein the first category of requests comprise requests which are carried out in a foreground process and wherein the second category of requests comprise requests which are carried out in a background process.

20. A computer program product according to claim 18, wherein the requests comprise Universal Resource Locators (URLs).

21. A computer program product according to claim 20, wherein the requests in the second category comprise frequently visited URLs which are retrieved in a background process and wherein the requests in the first category comprise URLs which are to be retrieved in a foreground process.

22. A computer program product according to claim 18, wherein the means for preventing the transmission of requests comprises:
  computer program code which compares the monitored data rate to the transmission capacity of the communication channel; and
  computer program code which prevents the transmission of requests over the communication channel in the second category if the requested data associated with a request in the first category has not been received and based on the comparison of the monitored data rate and the transmission capacity and a threshold associated with the transmission capacity.

23. A computer program product according to claim 22, further comprising computer program code which allows the transmission of requests over the communication channel in the second category if there are no requests of the first category, all data has been received for requests in the first category or the monitored data rate is not greater than the threshold associated with the transmission capacity.

24. A computer program product according to claim 22, wherein the threshold associated with the transmission capacity comprises the transmission capacity minus a value.

* * * * *